*I. S. Harris,*
*Sharpening Reciprocating Saws.*
*Nº 801.        Patented June 21, 1838.*
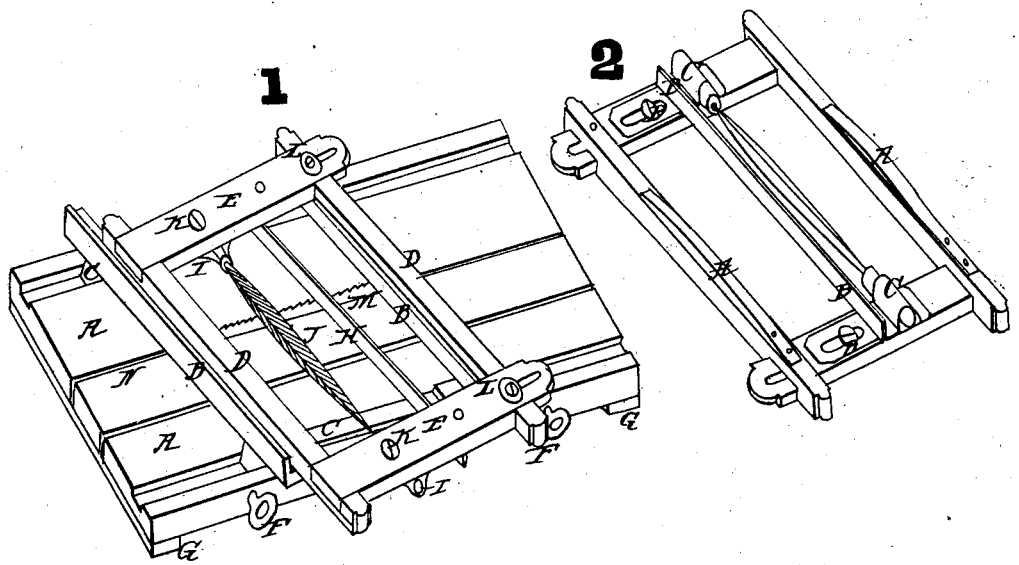

UNITED STATES PATENT OFFICE.

JAMES S. HARRIS, OF POULTNEY, VERMONT.

MACHINE FOR FILING HANDSAWS.

Specification of Letters Patent No. 801, dated June 21, 1838.

*To all whom it may concern:*

Be it known that I, JAMES S. HARRIS, of Poultney, in the county of Rutland and State of Vermont, have invented a new and useful Machine for Filing Hand and Wood Saws; and I do hereby declare that the following is a full and exact description.

The nature of my invention consists in the construction of an oblong platform or clamp, in which the saw is fastened, and upon which a carriage moves in grooves, and also, of a frame to which a file and guide are suspended, which frame moves in grooves upon the carriage; which machinery, when arranged, is intended to file a saw in any of the required modes, and to file its teeth equally distant and mechanically alike.

To enable others skilled in the art to make and use my invention, I will proceed to describe its construction and operation.

I construct my clamp as represented in the accompanying drawing, where—

A A, are composed of inch boards about three feet long and three inches wide, each. These boards I place upon the cross sills G, G, and fasten them to the same by screws or otherwise, between these boards I place a movable board N which is about two and three quarters inches wide. I place two screws F, with stationary nuts through the front board A, in a horizontal manner. These screws when turned, bear upon the board N and force it against the saw and rear board A and thereby forming the clamp. I place the saw to be filed, between the board N and the board A, in the rear as shown at M, with its teeth upward; being raised just above the surface of the clamp so to come in contact with the file, securing it in its place by the screws as aforesaid. I cut two grooves lengthwise the boards A, being parallel and about eight inches apart as ways for the carriage. I construct my carriage B, C, of wood or iron, in a square form, the runners being about three quarters of inch square, and ten inches in length and fit and place them in the grooves aforesaid. Upon these runners I place side pieces about fourteen inches in length and one inch square, securing them to the runners by screws. But in order to turn this carriage in its grooves, from a right angle with the saw, to form any required bevel angle with the same, I turn back these screws, so as to permit the side pieces B, to turn upon the screws. I also make mortises in the side pieces B, so as to permit the runners, to approximate each other and conform to their grooves. I half or groove the inner sides of the side pieces B, forming tracks for the file frame D. This file frame is of an oblong form, the sides being one half inch square and nine inches in length, its ends being composed of pieces two inches in width, and one half inch thick and about eight inches long. One side of this frame is made to slide and approximate the other side so as to conform to its grooves as shown at L. I attach to each end of my file a round pin or handle, which is about three inches in length and one half inch in diameter and is the axis of the file. By these pins the file is suspended to the frame by hinges, as shown at C, C, in drawing No. 2.

I set the file so as to correspond with the inclined plane of the saw teeth, intended to be filed, and confine the same at K, by screws, which are made to bear against the pins aforesaid. I place a plate of steel, parallel with this file, as a guide, which I suspend to the file frame by means of sliding hinges as shown at B, B. The curve of this guide must correspond with that of the file. This guide is intended to follow the file, and to ply between filed saw teeth. I place a steel spring under each side of the file frame, to raise the file frame above the saw teeth, as shown at A A.

The operation of my machine is as follows: I place the saw to be filed into the clamp as herein described. I place my carriage into its grooves and confine it at such angle with the saw as may be required. I place the file frame into its grooves, placing the guide the distance of three or four saw-teeth back of the file. I give the saw frame a vibrating motion until the guide B, is brought down to the base of the saw teeth. I move the carriage the distance of the saw tooth, and repeat the same process. After this manner I file one side of the saw teeth. I then reverse the carriage so as to make the same and equal angles with the saw, and repeat the process as above described until the saw is filed.

What I claim as my invention and desire to secure by Letters Patent is—

1. The combination of the clamp and carriage, both being constructed and operating substantially as herein described.

2. And I also claim the guide B, and the springs A A, in combination with the carriage as above described.

JAMES S. HARRIS.

Witnesses:
WILLIAM P. NOYES,
EBEN. WALLIS.